United States Patent

[11] 3,613,842

| [72] | Inventor | Peter Buciak |
| | | 2144 W. Superior St., Chicago, Ill. 60612 |
| [21] | Appl. No. | 848,917 |
| [22] | Filed | Aug. 11, 1969 |
| [45] | Patented | Oct. 19, 1971 |

[54] HYDRAULIC ARCUATELY OSCILLATING SHOCK ABSORBER
3 Claims, 7 Drawing Figs.

[52] U.S. Cl. .................................................. 188/306,
16/58, 188/309
[51] Int. Cl. ............................................ F16d 57/02
[50] Field of Search ........................................... 188/306,
308, 309, 310; 16/58

[56] References Cited
UNITED STATES PATENTS
1,893,625  1/1933  Land .............................. 188/89
1,940,694  12/1933  Peo .............................. 188/89 X
2,004,960  1/1935  Peo .............................. 188/277

FOREIGN PATENTS
2,510  6/1926  Australia ...................... 188/89

Primary Examiner—George E. A. Halvosa
Attorney—Gary, Parker, Juettner, Pigott & Cullinan ABSTRACT: A hydraulic shock absorber for automobiles having improved method and means for constructing the base or chamber of the device and its association with a pair of fixed radially disposed arms containing at least one or an opposed pair of ball check valves, and to improved methods and means for making rotary wing shafts supporting impeller wings for disposition between said fixed arms.

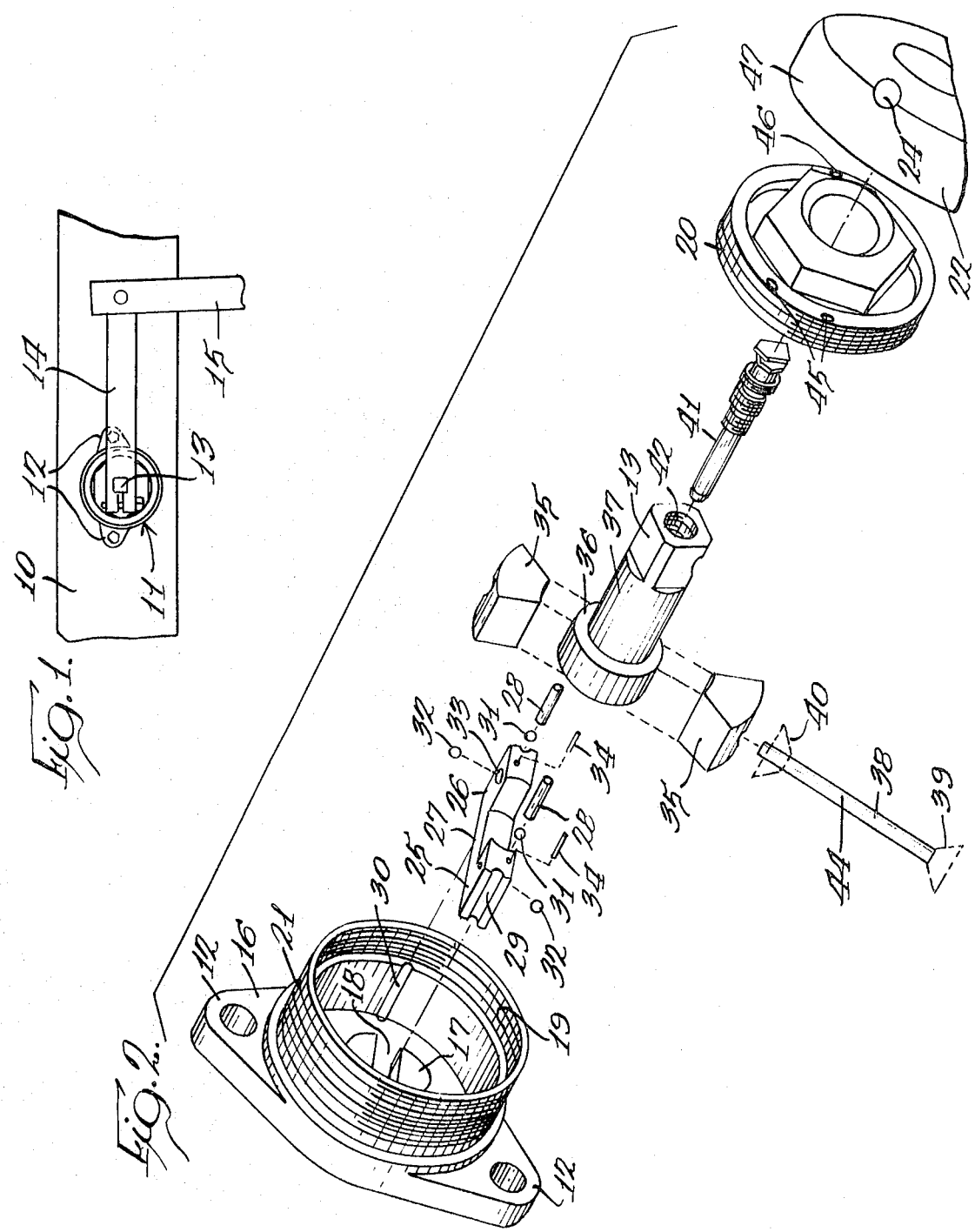

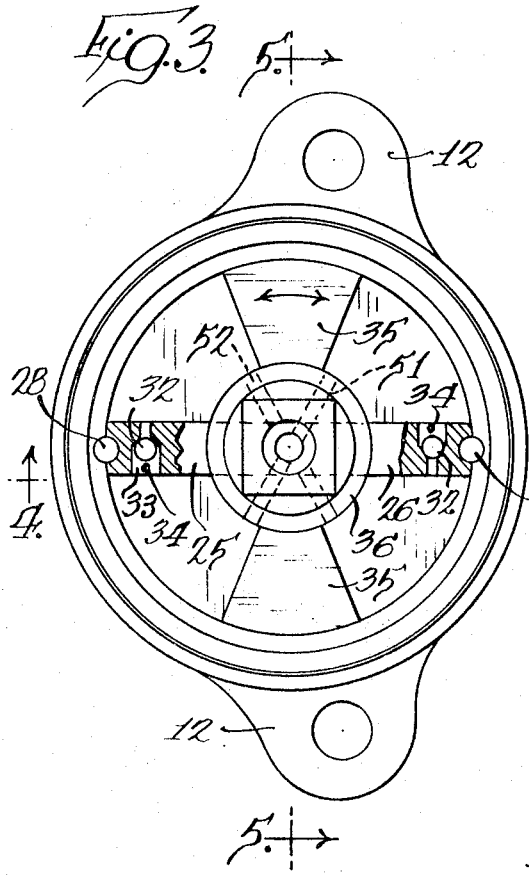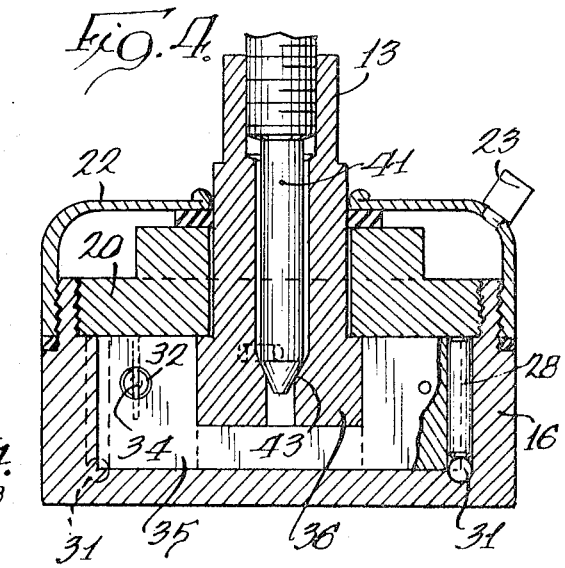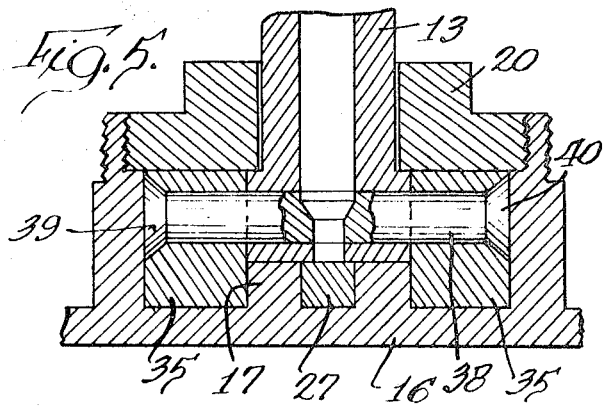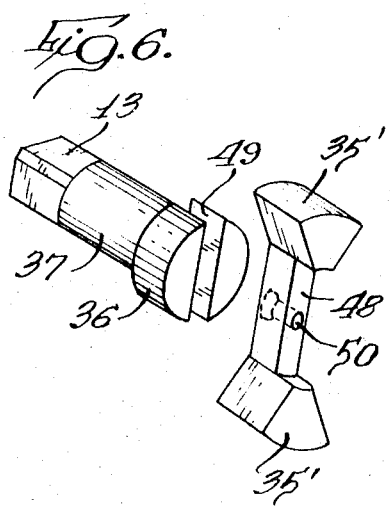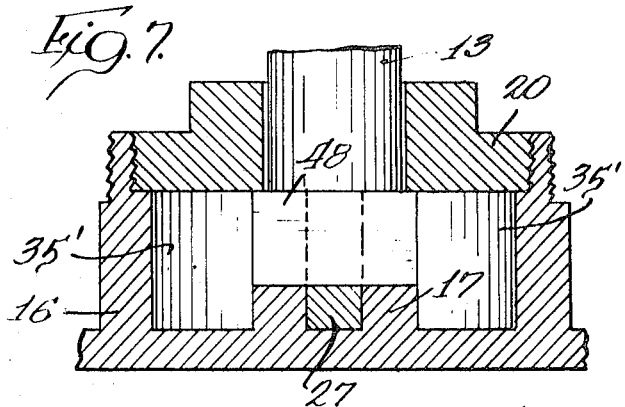

HYDRAULIC ARCUATELY OSCILLATING SHOCK ABSORBER

The present invention is directed to an hydraulic shock absorber for automobiles of the kind set forth in U.S. Pat. Nos. 1,087,017 and 1,426,155 and more particularly to improvements in the construction and method of making same in a simplified and economical manner, permitting economic reconstruction or replacement.

In general, the shock absorber of the present invention comprises a housing within which there is integrally formed an axial boss and diametrically opposed stator arms between which there is received a pair of rotor or impeller wings carried at one end of the wing shaft, one or both of the fixed arms being formed with ball check valves for damping or cushioning the vertical movement of the motor vehicle on its springs or in aid thereof.

MOre specifically, the hydraulic shock absorbers with which the present invention is concerned comprises a tubular body including a base formed in an integrally projecting axial boss and external ears for engagement between fixed automobile body portions, including a pair of fixed radially disposed arms having a relatively depressed medial portion, the arms being sealed against the inner periphery of the tubular body. At least one and/or both of said arms include a ball check valve. A rotary wing having an angular outer end portion for engagement by shock absorber actuating or crank arm has an inner end cylindrical portion carrying radially oppositely extending impeller wings movably disposed between the aforesaid fixed arms. The wing shaft at its shoulder portion is formed with intersecting bores opening to the chamber areas between said fixed arms and said movable wings. For completion of the assembly, a body-sealing nut and adjusting screw extend axially of the wing shaft into seating engagement with the defines of an aperture in the intermediate portion between the wings and is covered by a nut bushing threaded within the tubular body portion and an annular cover having an hydraulic liquid-filling aperture, receiving the angular end of the wing shaft through an axial aperture thereof.

Previous constructions involved intricate casting and machining which were expensive to produce. As distinguished therefrom, the present invention employs simple parts and assembly. For example, by forming the base of the tubular body with an axial boss I mill therein an axial slot for reception of the fixed or stator arms, there being a medially depressed portion joining the stator arms which seats within the radial slot. This part can be made of machined bar stock.

Likewise, the rotary wing shaft of the present invention is formed of round bar stock formed with an angular outer end and cylindrical shoulder at its inner end. The movable rotor wings are secured thereto in at least one of two manners. For example, in one manner, by forming the two wings with an intermediate straight connector portion and seating this straight portion within a slot milled in the bottom end of the shoulder portion of the wing shaft and then securing the two together. In another form, I make the wings separately with the inner contours flat or arcuate matching the outer surface of the shoulder, and drill or broach them so as to receive a pin to suit the type of hole through them and through the shoulder, one end of the pin being headed and the other being then peened over the form a complete assembly.

The details of construction, arrangement of parts and economies thereof, of the present invention and method of assembly will be apparent from a consideration of the following specification and accompanying drawings wherein:

FIG. 1 is a side elevational view showing the shock absorber of the present invention installed in an automobile frame.

FIG. 2 is an exploded view of the shock absorber of the present invention showing one method of forming and assembling the impeller wings with the shouldered end of the wing shaft.

FIG. 3 is an assembled plan view of the shock absorber of the present invention with the cover and screw bushing removed.

FIG. 4 is a section on the line 4—4 of FIG. 3 with the cover thereon.

FIG. 5 is a section on the line 5—5 of FIG. 3.

FIG. 6 is an exploded view of a modified arrangement of assembling the impeller wings to the shouldered base of the wing shaft.

FIG. 7 is a sectional view similar to that of FIG. 5 embodying the components of FIG. 6.

Referring to the drawings, the reference numeral 10 indicates the frame of an automobile body having a shock absorber generally indicated as 11 secured thereto by the ears 12, 12. The shock absorber has a wing shaft having an outer angular portion 13 to which there is attached the shock absorber arm 14 which leads to the shock absorber link plug 15 and thence to an axle attached to, for example, a leaf spring, not shown.

The shock absorber 11 comprises a flat bottom portion 16 and the inner axial boss 17 which is formed with a milled radial slot 18. The housing 16 is formed with an internal thread 19 for subsequent reception of the nut bushing 20 and an external thread 21 for reception of the cover 22, the cover 22 being provided with a filler cap 23 seated in the filler aperture 24.

The stator comprises a pair of fixed radially disposed arms 25 and 26 between which there is a depressed or medial portion 27 lying in a common plane which radially slidably seats in the milled slot 18 of the boss 17. The outer end of the arms 25 and 26 are secured against the inner peripheral wall of the body 16 by means of the pins 28 seated in matching adjacent grooves 29 and 30 in the outer ends of the arms and inner periphery of the body 16 respectively, a lead ball 31 being inserted first whereby a good seal may be obtained when the pins 28 are driven in place. Either one and/or both the arms 25 and 26 are formed with apertures relatively wide at one end and relatively small at the other (these directions being opposed in the two arms) within which is trapped a check valve ball 32 retained against movement from the outer end of the openings 33 by means of the pins 34. The check valve balls 32 being thus loosely held within the tapered cavities 33 thus permit oil to pass or be excluded depending on the motion of the moving wings 35, 35 secured to the shoulder 36 at the inner end of the rotary wing shaft 37.

In the form shown in FIGS. 2-5 the wings 35 which are shown separated in the exploded view of FIG. 2 have inner peripheries contoured to the outer periphery of the rounded shoulder 36 and outer peripheries contoured to the inner periphery of the housing 16. The wings 35, 35 are further provided with axial bores and then secured against the shoulder 36 by means of the round or square pin 38 which may have a head 39 at one end and then be peened over at its opposed end 40 to form a secure assembly. Rotary movement of the shaft 34 causes passage of hydraulic liquid through one of the apertures 33 and preventing movement of liquid through the aperture in the opposed arm, depending upon the direction of rotation as will be understood.

However, communication at all times in the body 16 and between the adjacent movable wings and fixed arms is provided by means of the pair of radial slots 51 and 52 extending across the shouldered portions of the wing shaft as shown in FIG. 3.

A body-sealing nut and adjusting screw 41 extends through the axial aperture 42 of the rotary wing shaft 37 and seats against the defines of the aperture 43 in the shoulder portion 36, the aperture extending through the hole 44 in the pin 38 shown in FIG. 2. The nut bushing 20 is provided with a pair of air vents 45 of pinhole size, and a check valve 46 such as previously described, the hole being covered by a cap 47 having an aperture 24 for admission of hydraulic fluid and a filler cap 23 therein.

As shown in FIGS. 6 and 7, the movable wins 35', 35' are connected by an intermediate straight shaft portion 48 which secures them together and seats in the radial slot 49 in the shoulder 36 at the inner end of wing shaft 37, the component 48 being formed with an aperture therethrough being in part tapered as at 50 to provide a seat for the inner end of the sealing adjustment nut 41.

Although I have shown and described the preferred embodiment of my invention, it will be understood by those skilled in the art that changes may be made in the details thereof without departing from its scope.

I claim:

1. An hydraulic shock absorber comprising a tubular body including a base formed with an internally projecting solid axial boss and external ears for engagement to a fixed automobile body portion and an internally and externally threaded open end portion, a fixed stator having a pair of radially disposed arms and depressed medial portion lying in a common plane and radially, slidably seated within a radial slot formed in said boss and endwise sealed against the inner periphery of said tubular body, at least one of said arms including a ball check valve or both of said arms including oppositely opening and closing ball check valves, a rotary wing shaft having an angular outer end portion for operative engagement by a shock absorber actuating arm and an inner end cylindrical shoulder portion carrying radially oppositely extending impeller wings movably disposed between said arms, said wing shaft at its said shoulder portion being formed with intersecting bores opening to the chamber areas between said fixed arms and said movable wings, a body-sealing nut and adjusting screw extending axially of said wing shaft into seating engagement with the defines of an aperture in the intermediate portion between said wings, a nut bushing threaded within said tubular body open end portion and a separate annular cover having an hydraulic liquid filling aperture and cap in threaded engagement over said body open end portion and receiving the angular end of said wing shaft therethrough.

2. The shock absorber of claim 1 wherein said impeller wings are separately formed and are in bolted engagement with said shoulder portion.

3. The shock absorber of claim 1 wherein said impeller wings are separately formed and joined together by an integral arm, said arm being seated in a slot formed in the bottom end of said wing shaft shoulder portion.